United States Patent [19]

Iijima

[11] Patent Number: 4,882,500

[45] Date of Patent: Nov. 21, 1989

[54] METHOD FOR CONVERTING STANDING WAVE VIBRATIONS INTO MOTION AND STANDING WAVE MOTOR THEREFOR

[75] Inventor: Tamotsu Iijima, Kofu, Japan

[73] Assignee: Nippon Seimitsu Kogyo Kabushiki Kaisha, Kofu, Japan

[21] Appl. No.: 245,944

[22] Filed: Sep. 19, 1988

Related U.S. Application Data

[63] Continuation of Ser. No. 58,100, Jun. 4, 1987, abandoned.

[30] Foreign Application Priority Data

| Jun. 4, 1986 | [JP] | Japan | 61-129809 |
| Jun. 4, 1986 | [JP] | Japan | 61-129810 |
| Jun. 4, 1986 | [JP] | Japan | 61-129811 |
| Jun. 4, 1986 | [JP] | Japan | 61-129812 |
| Jun. 4, 1986 | [JP] | Japan | 61-129813 |

[51] Int. Cl.$^4$ ............................................ H01L 41/08
[52] U.S. Cl. ........................................................ 310/323
[58] Field of Search .............. 310/316, 317, 321, 323, 310/325, 328

[56] References Cited

U.S. PATENT DOCUMENTS

| 4,453,103 | 6/1984 | Vishnevsky et al. | 310/328 X |
| 4,562,374 | 12/1985 | Sashida | 310/328 |
| 4,580,073 | 4/1986 | Okumura et al. | 310/328 X |
| 4,634,916 | 1/1987 | Okada et al. | 310/328 X |
| 4,642,509 | 2/1987 | Kumada | 310/328 X |
| 4,663,556 | 5/1987 | Kumada | 310/328 X |
| 4,692,651 | 9/1987 | Hiramatsu et al. | 310/328 X |
| 4,739,212 | 4/1988 | Imasaka et al. | 310/323 |
| 4,752,711 | 6/1988 | Tsukimoto et al. | 310/323 |
| 4,771,203 | 9/1988 | Mukohjima et al. | 310/323 |
| 4,779,019 | 10/1988 | Onishi et al. | 310/323 |

*Primary Examiner*—Mark O. Budd
*Attorney, Agent, or Firm*—Oblon, Spivak, McClelland, Maier & Neustadt

[57] ABSTRACT

Standing wave vibrations which are generated in an elastic vibration member by a vibrator can be effectively converted into a linear or rotary motion by transmitting the standing wave vibrations to a moving member through motion extracting means which are arranged on the vibration member at intervals of half wavelength of the standing wave and each located on a portion substantially exclusive of the node and loop of the standing wave. According to this method, a linear or rotary motor of high performance can be accomplished.

27 Claims, 9 Drawing Sheets

FIG_1(A)

FIG_1(B)

FIG_1(C)

FIG_2(A)

FIG_2(B)

FIG_3

FIG_4

FIG_5

FIG_6

FIG_7

FIG_8

FIG_9

FIG_10(A)

FIG_10(B)

FIG_12(A)

FIG_12(B)

FIG_13(A)

FIG_13(B)

FIG_14(A)

FIG_14(B)

FIG_15

FIG_16

METHOD FOR CONVERTING STANDING WAVE VIBRATIONS INTO MOTION AND STANDING WAVE MOTOR THEREFOR

This application is a continuation of application Ser. No. 058,100, filed on June 4, 1987, now abandoned.

BACKGROUND OF THE INVENTION

1. Field of the Invention

This invention relates to a method for converting standing wave vibrations into a linear or rotary motion and to a standing wave motor which is driven by this method. More particularly, this invention relates to a method and a standing wave motor which are capable of moving a moving member with high efficiency by use of at least one vibrator generating a standing wave in a vibration member.

2. Description of the Prior Art

It has been known that ultrasonic vibrations caused in an elastic body by applying a periodic voltage thereto can be converted to a rotary or linear motion. A variety of vibration wave motors driven on this principle have been hitherto proposed. The motor of this type has an advantage that it enjoys simplicity and compactness of structure compared with an electromagnetic motor because it has no need for any electromagnetic means such as a coil and that it can produce a rotary motion of relatively high torque even at a low speed. Therefore, the vibration wave motors are attracting keen attention.

The conventional vibration wave motors are classified into the following four types.

A. PROGRESSIVE-WAVE TYPE MOTOR (A-1) Motor having need of an absorber for absorbing a progressive wave reaching one end face of an elastic body or wave-energy feedback system for sending back the progressive wave reaching the one end face to the other end face of the elastic body, thereby to prevent the progressive wave from being reflected at the end face of the elastic body. (e.g. U.S. Pat. No. 4,562,374; Japanese Patent Application Disclosures SHO 60-91876(A) and SHO 61-9175(A))

(A-2) Motor using a progressive wave which is generated by synthesizing two standing waves different spatially in phase with time. (e.g. U.S. Pat. Nos. 4,484,099 and No. 4,562,373; Japanese Patent Application Disclosures SHO 58-148682(A), SHO 59-148581(A), SHO 59-201685(A), SHO 60-62884(A), SHO 61-106076(A), and SHO 61-116977(A))

B. STANDING-WAVE TYPE MOTOR (B-1) Motor in which two sorts of stationary vibrations are synthesized. (e.g. Japanese Patent Application Disclosures SHO 56-138469(A), SHO 57-78378(A), and SHO 61-54886(A))

(B-2) Motor using one sort of stationary vibrations. (e.g. Japanese Patent Application Disclosures SHO 60-91879(A), and SHO 60-207467(A))

In the progressive-wave type motor of (A-1) noted above, the progressive wave reaching the end face of the elastic body cannot completely be counteracted by the aforementioned absorber disposed on the end portion of the elastic body, but it undergoes a change into heat, thereby to cause the efficiency of the motor to be reduced. In the case that the wave-energy feedback system is used instead of the absorber, the motor has suffered a disadvantage that it is complicated in structure.

The motor of (A-2) noted above utilizing the progressive wave created from synthesized standing waves necessitates two vibrators which are excited by periodic voltages each shifted by 90° in phase. Thus, this progressive-wave type motor complicated in structure and difficult to control, and besides, it cannot be driven with high efficiency In the standing-wave type motor of the above listed (B-1), generation of the standing wave is accomplished by extracting and synthesizing amplitude vibrations at the respective central portions of piezoelectric elements serving as a vibrator (i.e. at the loop of the standing wave) The amplitude vibrations thus extracted at the loop of the standing wave have only a transverse motion vector orthogonal to the surface of the piezoelectric element, but does not have a longitudinal motion vector necessary for driving a moving object in the horizontal direction parallel to the surface of the elastic vibration body. Since the transverse motion vector must therefore be converted into the longitudinal motion vector, the efficiency of motion is lowered because the longitudinal component of the transverse motion vector is less than the transverse motion vector energy as a matter of course.

The standing motor of (B-2) using a single vibrator for generating one sort of stationary vibrations has an advantage that it is simple in structure and driven with high efficiency. However, this does not means that the motors of this type are perfectly free from disadvantages. As has been typically proposed in Japanese Patent Application Disclosure SHO 60-91879(A), the prior art motor driven by the stationary vibrations comprises a rotor and a stator which are simultaneously excited to generate standing wave vibrations having the same wavelength, in which the rotor is driven to rotate by moving the standing wave generated in the stator. That is, in this motor, transmission of rotational energy from the stator to the rotor is fulfilled by permitting the waveforms of the standing waves generated on the surfaces of the stator and rotor to be meshed with each other. Accordingly, the contact surfaces of the stator and rotor must be subjected to smooth surface finishing with a high accuracy. In addition, this motor necessitates a special control system for continuously shifting the waveform of the standing wave generated in the stator.

SUMMARY OF THE INVENTION

The present invention aims to eliminate the aforementioned drawbacks of conventional vibration wave motors. An object of invention is to provide a method for efficiently converting standing wave vibrations into a linear or rotary motion by use of at least one vibrator, and a standing wave motor of enhanced performance for working the method described above, which can be made simple in structure and produce a linear or rotary motion of remarkably large torque.

To attain this object according to this invention, there is provided a method for converting standing wave vibrations into a linear or rotary motion, which comprises extracting the amplitude motion of a standing wave generated in an elastic vibration member from at least one portion within the odd or even numbered sections of quarter wavelength sections which are defined by equally dividing each wavelength of the standing wave into four, which portion is substantially exclusive of loop and node of the standing wave, and transmitting the amplitude motion thus extracted to at least one moving member.

Further, the present invention provides a standing wave motor for working the method described above, which comprises at least one vibrator disposed on an elastic vibration member and adapted to generate a standing wave in the vibration member, at least one row of motion extracting means located in the odd or even numbered sections of four quarter wavelength sections which are defined by equally dividing each wavelength of the standing wave into four at a portion substantially exclusive of a loop and a node of the standing wave, and at least one moving member being in contact with the motion extracting means.

Standing wave vibrations generated in the vibration member at the positions exclusive of the loop and node of the standing wave have longitudinal motion vector relative to the surface of the vibration member. Thus, by means of the motion extracting means which are located on the aforementioned portions of the vibration member and arranged at intervals of half the wavelength of the standing wave, vibration energy in one direction can be transmitted to the moving member which is in contact with the motion extracting means, thereby to permit the moving member to move in one direction along the surface of the vibration member.

By use of a straight rectangular bar as a vibration member, a linear motor is accomplished. When the vibration member is formed in an annular shape, a rotary motor of high performance can be obtained.

The features of the present invention which are believed to be novel are set forth with particularity in the appended claims. The present invention, both as to its organization and manner or operation, together with further objects and advantages thereof, may best be understood by reference to the following description, taken in conjunction with the accompanying drawings.

DESCRIPTION OF THE PREFERRED EMBODIMENTS

This invention resides fundamentally in a method capable of converting a standing wave generated on an elastic body by use of a vibrator to a linear or rotary motion and a standing wave motor which is driven by the aforementioned method. At the outset, the operational principle of the standing wave-to-motion conversion according to this invention will be described with reference to FIGS. 1(A) and 1(B).

Figure 1A:
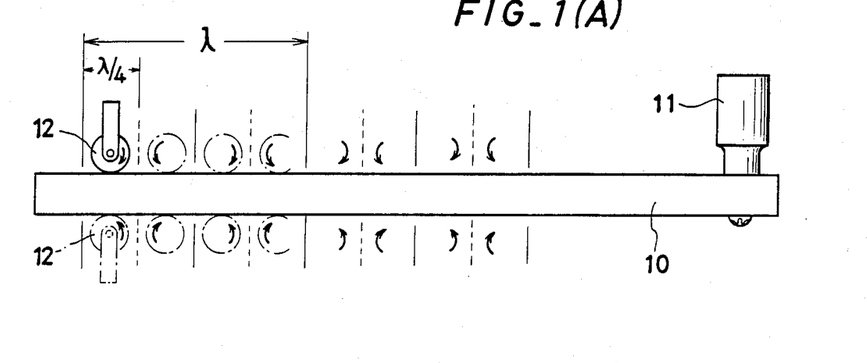
FIGS. 1(A) to 1(C) are schematic explanatory diagrams illustrating the principle underlying the method of this invention for converting standing wave vibrations into motion.

FIG. 1(A) schematically illustrates a model which was used in experiments conducted by the inventor of this invention, consequently to find out the principle of the standing wave-to-motion conversion underlying the present invention. This model comprises a vibration member 10 of an elastic square bar and a vibrator 11 disposed on the vibration member 10. The vibration member 10 used by way of experiment is made of brass and has a thickness of 15 mm, a width of 10 mm and a length of 150 mm. The vibrator 11 is of the Langevin type and driven by an application of a periodic voltage to generate a flex standing wave in the vibration member 10. When a roller 12 serving as a motion extracting means was pressed to the vibration member 10 being vibrated by the vibrator 11, a peculiar rotational behavior of the roller 12 was found. That is, as is illustrated in FIG. 1(A), when the roller 12 in touch with the surface of the vibration member 10 being vibrated was moved in the lengthwise direction of the vibration member, the direction of rotation of the roller 12 was reversed at the loop and node of the standing wave. Namely, reverse of rotation of the roller appeared every quarter of the wavelength of the standing wave ($\lambda/4$). In one experiment, when the vibrator 11 was excited by a periodic voltage of 43.2 KHz, pitches defined between the points of reversal (loop and node of the standing wave) were measured to about 13 mm. The wavelength $\lambda$ of the standing wave generated at that time can be calculated in accordance with the following general formula to lead to 26.9 mm. This calculated value will be found to be almost identical to two times the actual measurements noted above.

$$\lambda^2 = 4\pi^2(E/12\rho)^{\frac{1}{2}} \cdot b/\omega$$

where E is a Young's modulus, $\pi$ the density of the elastic vibration member, b the thickness of the vibration member, and $\omega$ a circular frequency.

Figure 1B:
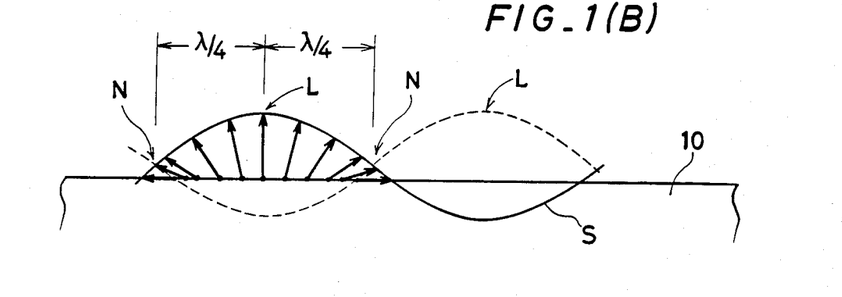

Further, the result of experiment proved that the elastic vibration member being vibrated does not bring about amplitude vibrations over the entire surface, which are caused in the lateral direction orthogonal to the surface thereof, but it vibrates, as illustrated in FIG. 1(B), in the lateral direction (the vertical direction in the drawing) at the loop of the standing wave and in the longitudinal direction (the horizontal direction in the drawing) at the node N of the same. In between the loop L and the node N of the standing wave, the directions in which the surface of the vibration member vibrates are continuously varied proportional to the distance from the loop or node of the standing wave, as illustrated. Because a standing wave generally imparts the maximum amplitude motion to the surface of the vibration member at the loop portion of the standing wave, a conventional vibration wave motor which is driven by the standing wave has hitherto been designed so that the amplitude motion of the standing wave is extracted at the loop portion thereof to move a moving member. Thus, in the conventional vibration wave motor, only the amplitude motion in the orthogonal direction relative to the plane surface of the elastic vibration member can be used, and therefore, the longitudinal vector component which is necessary for the movement of the moving member has been produced by use of at least two vibrators, which are superposed each other. Disadvantageously, such a vibration wave motor using a plurality of vibrators is complicated in structure and controlling system for exciting the vibrators and has poor efficiency.

The standing wave motor according to this invention can eliminate the various drawbacks suffered by the conventional motor of this type and permits the vibration energy of a standing wave in a vibration member to be extracted with high efficiency by means of a single vibrator. This will be described hereinafter.

Figure 1C:
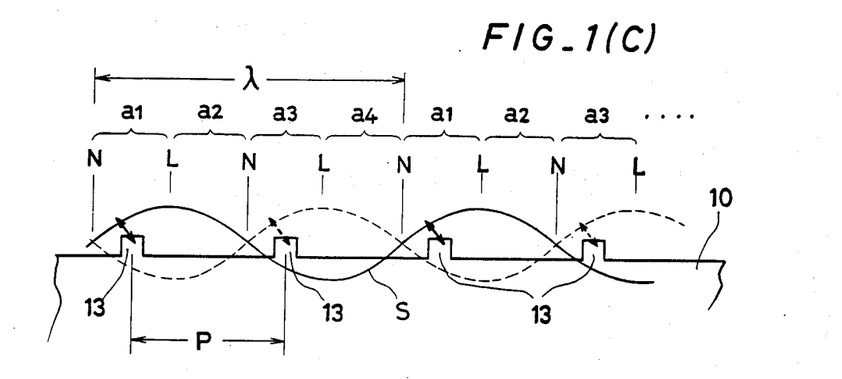

The standing wave motor with one vibrator according to this invention can be accomplished by extracting the amplitude motion generated at the portions substantially exclusive of the loop and node of the standing wave. That is to say, the standing wave motor according to this invention has motion extracting means 13 located in the odd numbered sections a1, a3 (in the case shown in FIG. 1(C)) or the even numbered sections a2, a4 of quarter wavelength sections a1–a4 which are defined by equally dividing one wavelength $\lambda$ of the standing wave S into four so as to form boundaries at the loops L and nodes N of the standing wave. Therefore, the interval P between the adjacent motion extracting means 13 is equal to half the wavelength ($\lambda/2$) of the standing wave. When the vibrator 11 is excited to bring about the standing wave vibrations in the vibration member 10, the motion extracting means 13 oscillates in the direction of the arrow shown in FIG. 1(C) on the positive side relative to the surface of the vibration member. Since this oscillation motion of the motion extracting means 13 includes the unidirectional vector parallel to the surface of the vibration member 10, a moving member is moved in the longitudinal direction of the vibration member 10 when it is in touch with the motion extracting means 13 on the vibration member.

By employing the aforementioned principle of this invention, a linear or rotary motor of high torque can be realized.

Figure 2A:
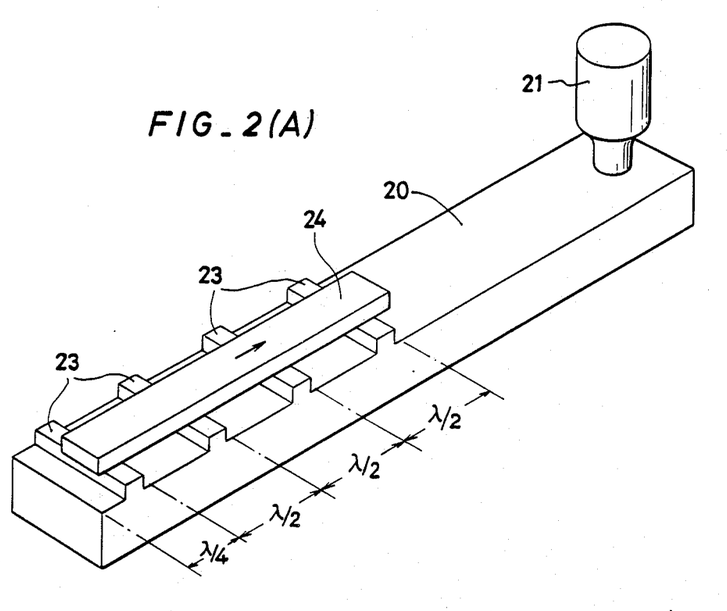
FIGS. 2(A) and 2(B) are a perspective view and a side view schematically illustrating one embodiment of the vibration wave motor according to this invention.

The first embodiment of the motor provided by the present invention will be described with reference to the schematic diagrams of FIGS. 2(A) and 2(B).

Figure 2B:
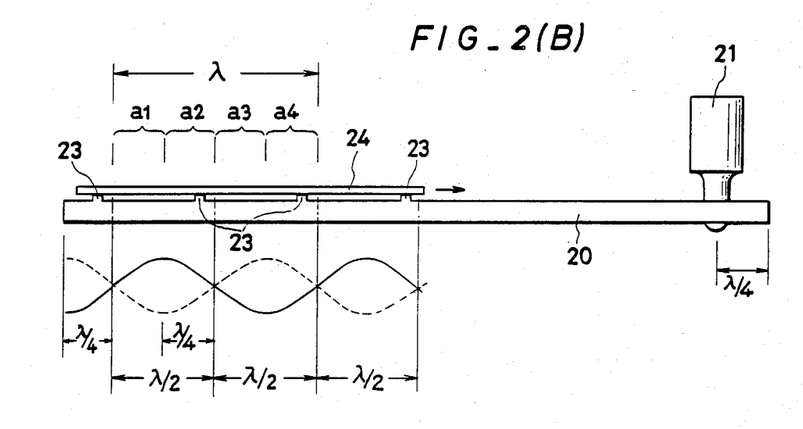

The motor shown in FIG. 2 is of a linear type using a vibration member 20 of a straight elastic rod having a square cross section. At the one end portion of the vibration member 20, a vibrator 21 is disposed so as to excite the vibration member 20 to produce a standing wave having a fixed wavelength $\lambda$. The vibration member 20 is provided on its surface with motion extracting means 23 shaped in protrusions. The motion extracting means 23 are located at the regular intervals of $\lambda/2$ in the even numbered sections a2, a4 of the four quarter wavelength sections a1–a4 into which the wavelength $\lambda$ of the standing wave generated in the vibration member 20 is equally divided. When the vibration member 20 is excited to generate the standing wave, the motion extracting means 23 vibrate in the right-upper direction in FIG. 2(B) on the positive side relative to the surface of the vibration member 20. Therefore, when the moving member 24 is brought into intimate touch with the motion extracting means 23, it moves rightward in the drawing. As will be understood from the above, a linear motor mechanism to be applied to various machines can be constructed by fixing the vibration member 20 on a stationary part of the machine and having the moving member 24 attached to a movable follower of the machine or formed integrally as a part of the follower. Further, to allow the vibratior member 20 to generate the desired standing wave therein, the length of the vibration member must be determined so that the vibration member 20 is terminated to either end thereof at quarter the wavelength $\lambda/4$ of the standing wave generated therein. Namely, the vibration member 20 has a length equal to integral multiples of the half wavelength $\lambda/2$ of the standing wave.

Figure 3:
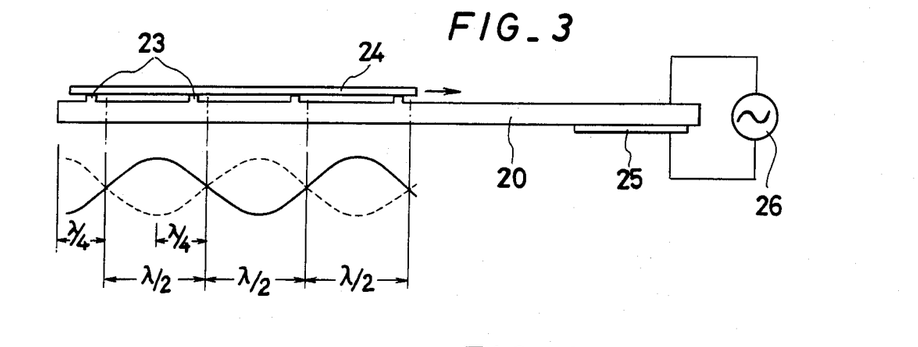
FIGS. 3 to 9 are side views schematically illustrating other embodiments of this invention.

A standing wave motor illustrated in FIG. 3 as another embodiment adopts a piezoelectric element as a vibrator 25 in place of the Langevin type vibrator as used in the former embodiment, wherein the vibration member 20 is excited to generate a standing wave of a fixed wavelength by applying a periodic voltage thereto. In this embodiment, the identical components are denoted by the same numerical symbols as in the former embodiment.

Figure 4:
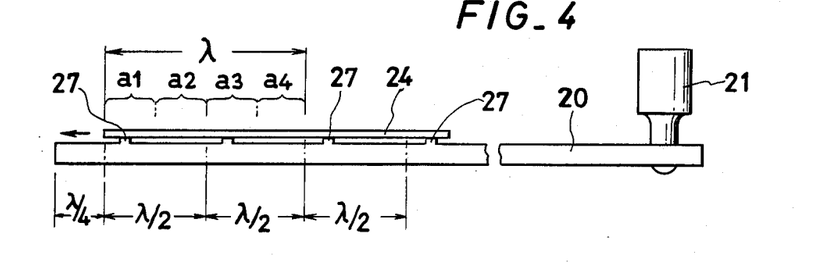

In a standing wave motor illustrated in FIG. 4, protrusions 27 serving as motion extracting means are formed in the odd numbered sections a1, a3 of the quarter wavelength sections which are defined by equally dividing the wavelength of the standing wave into four. With this arrangement, the motion extracting means vibrate in the left-upper direction in the drawing on the positive side of the surface of the vibration member 20, thereby causing the moving member 24 in contact with the motion extracting means 27 to be moved leftward.

Figure 5:
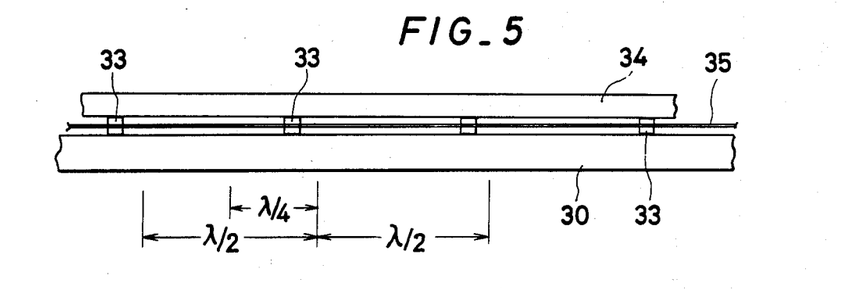

The motion extracting means in the foregoing embodiments are in the shape of protrusions which are integrally formed on the vibration member. However, as illustrated in FIG. 5, there may be disposed motion extracting means 33 independent of vibration member 30 between the vibration member and a moving member 34. By 35 is denoted a retainer for holding the motion extracting means 33 at the intervals of the half wavelength $\lambda/2$ of the standing wave generated in the vibration member 30. Similarly to the foregoing embodiments, when the vibration member 30 is excited to generate the standing wave, the kinetic energy of the standing wave is transmitted to the moving member 34 through the motion extracting means 33, thereby to impart a linear motion to the moving member 34.

Figure 6:
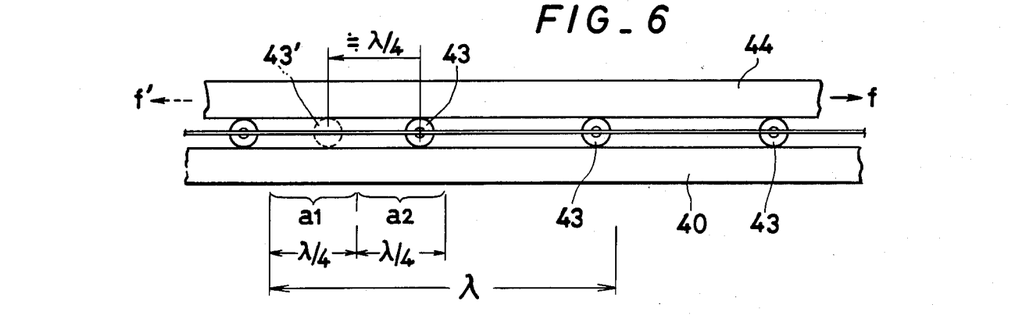

FIG. 6 represents a standing wave motor using a series of rollers 43 serving as motion extracting means as shown in the foregoing embodiments. The rollers 43 are held by a retainer 45 at the intervals of the half wavelength $\lambda/2$ of the standing wave generated in the vibration member 40. The kinetic energy of the standing wave is likewise transmitted to the moving member 44 through the rollers 43, thereby to cause linear movement of the moving member 44. Making a comparison between the arrangements of FIG. 2(B) and FIG. 4, it will be seemed that the moving member 44 can be reversely moved only by shifting the series of rollers 43 in the longitudinal direction of the vibration member 40 by substantially quarter the wavelength of the standing wave ($\lambda/4$). That is to say, by shifting the series of rollers 43 by substantially $\lambda/4$ from the second quarter wavelength sections a2 to the first quarter wavelength sections a1 (positions 43'), all the rollers 43 are changed in position from the even numbered sections to the odd numbered sections of the quarter wavelength sections, consequently to reverse the moving direction of the moving member 44 from F to F'. This mechanism can be applied to the motor in FIG. 5 as a matter of course.

Figure 7:
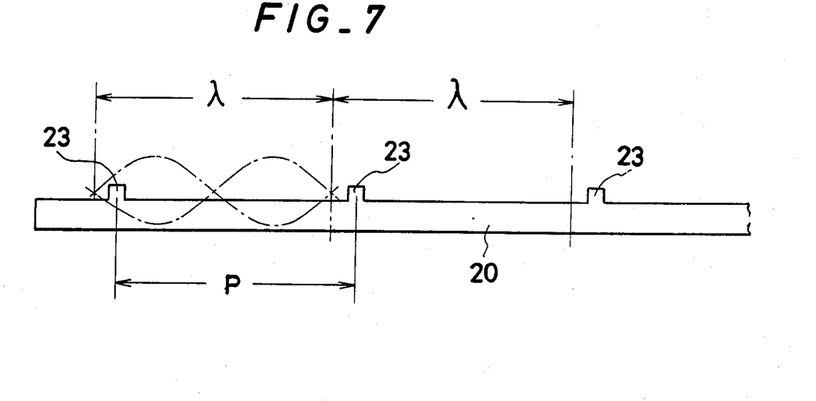

In the foregoing embodiments, the motion extracting means on the vibration member are arranged as located in the even or odd unmbered sections of the quarter wavelength sections by the half wavelength pitch ($\lambda/2$), whereas the motion extracting means need not be located by $\lambda/2$ if they are in the even or odd numbered sections as noted above. For example, the interval P between the adjacent motion extracting means 23 may be substantially equal to the wavelength of the standing wave as illustrated in FIG. 7.

Figure 8:
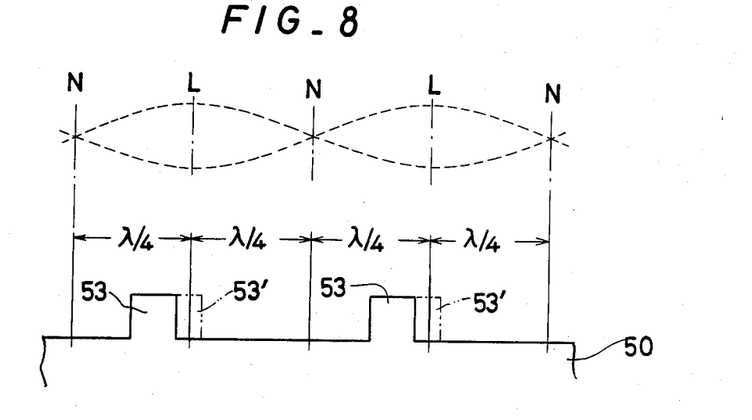

It is preferable to dispose motion extracting means 53 at the position substantially exclusive of the loop and node of the standing wave within one quarter wavelength section on vibration member 50 as schematically illustrated in FIG. 8, whereas it may be allowed to protrude laterally from the determined quarter wavelength section across the loop L (or node N) of the standing wave as shown by the imaginary line 53' in the drawing. In this case, the amount of the protrusions across the loop or node of the standing wave results in a loss in driving the standing wave motor.

Figure 9:
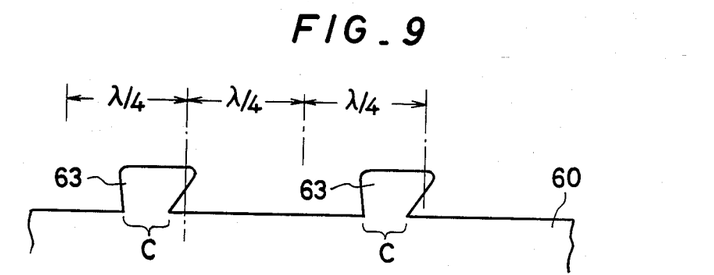

An arrangement illustrated in FIG. 9 in which motion extracting means 63 protrudes in part from the determined quarter wavelength section is of course covered with the present invention. That is, according to the concept of the invention, what is necessary is that the connection length C between vibration member 60 and motion extracting means 63 should be less than the quarter wavelength $\lambda/4$ of the standing wave generated in the vibration member. There is a case that the motion extracting means which is formed as spread toward its upper end is desirable because the contact area thereof relative to the moving member is wide to ensure high frictional contact between the motion extracting means and the moving member.

These structures can be of course applied to the foregoing embodiments and modified embodiments of the invention as described in the following.

Figure 10A:
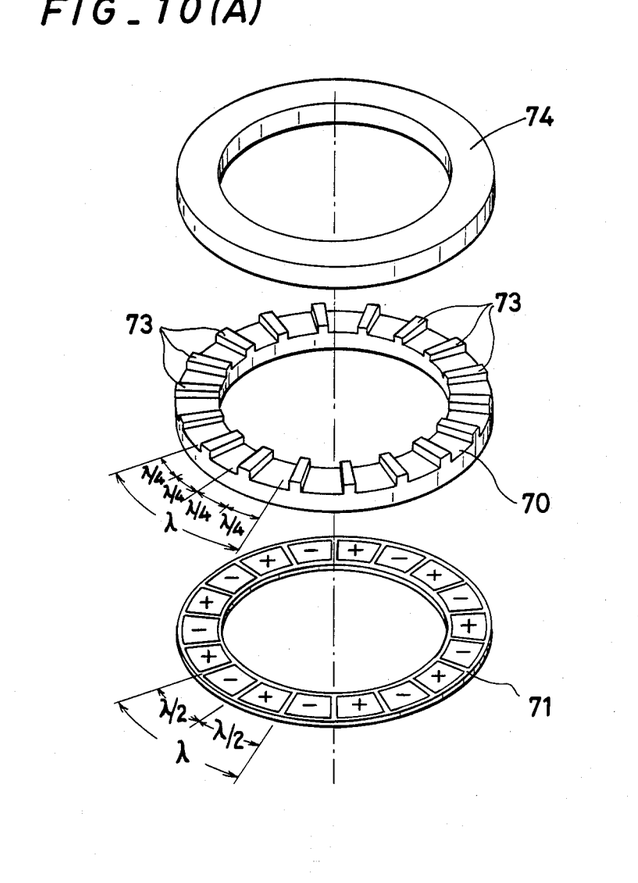
FIGS. 10(A) and 10(B) are a perspective view and a side view schematically illustrating another embodiment of this invention.

A rotary motor illustrated in FIG. 10 is substantially equivalent to that using an annular vibration member in place of, for example, the straight vibration member 20 of the motor shown in FIG. 2. This rotary motor comprises a vibration member 70 provided on its upper surface with a series of motion extracting means 73, a vibrator 71 attached to the lower surface of the vibration member 70 and constituted by a plurality of piezoelectric elements, and a moving member (rotor) 74 which is in contact with the motion extracting means 73. The circumferential length of the vibration member 70 is substantially equal to integral multiples of the wavelength of a standing wave produced therein. The piezoelectric elements constituting the vibrator 71 are circularly arranged alternately in porality so as to form a pair of positive and negative electric poles within one wavelength $\lambda$ of the standing wave.

Figure 10B:
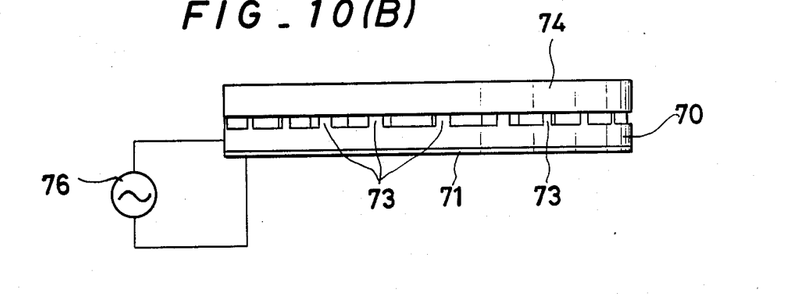

The vibrator 71, vibration member 70 and moving member 74 are superposed as shown in FIG. 10(B). To the vibration member 70 and the vibrator 71, there is connected a high frequency source 76 so as to apply a periodic voltage to the vibrator. The motion extracting means 73 are arranged on the vibration member 70 in the same manner as in the foregoing embodiments.

Namely, in this embodiment, the motion extracting means 73 are located within the even numbered sections a2, a4 of the four quarter wavelength sections a1–a4 defined every one wavelength of the standing wave. Thus, only the unidirectional kinetic energy of the standing wave generated in the vibration member 70 is transmitted to the moving member 74 through the motion extracting means 73. Consequently, the moving member 74 moves along the vibration member 70 on the same principle as in the foregoing embodiments, that is, it rotates clockwise about the axis thereof.

Counterclockwise rotation of the moving member 74 can be accomplished by providing the motion extracting means 73 within the odd numbered sections a1, a3 of the four quarter wavelength sections.

Though the vibrator 71 in the illustrated embodiment is constructed by serially aligning a plurality of piezoelectric elements in a circle, it may be constituted by an adequate nember of piezoelectric elements aligned in an arc. Of course, the piezoelectric elements may be separately arranged to form the vibrator, if they meet the positional requirement as noted above. Also, the moving member 74 may be shaped in an arc.

Figure 11A:
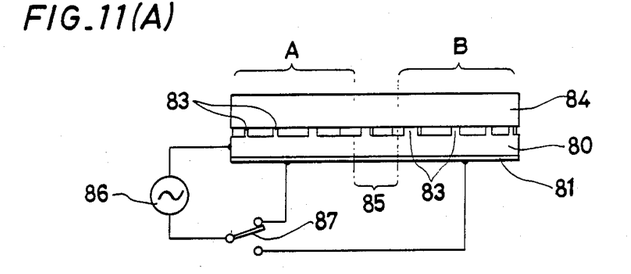
FIGS. 11(A) to 11(D) are a side view of the motor, plane views of a vibration member and a vibrator used in the motor of this invention, and an explanatory diagram illustrating the driving principle of still another embodiment of this invention.
Figure 11B:
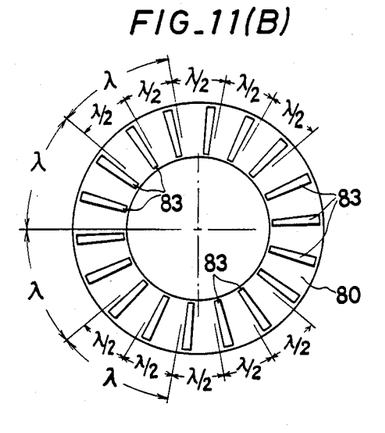
Figure 11C:
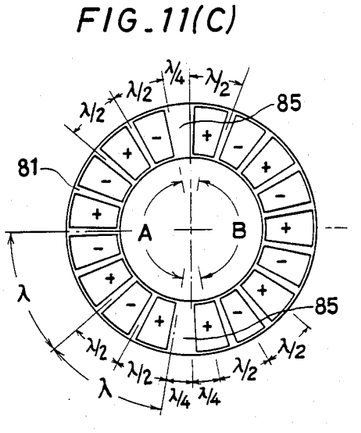
Figure 11D:
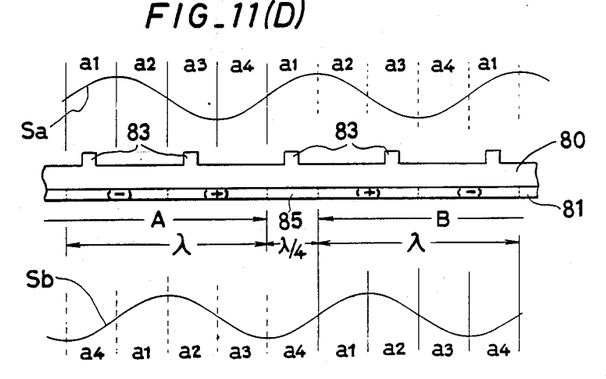

In FIG. 11(A) is shown a reversibly rotatable standing wave motor. This motor has a vibrator 81 constituted by two groups of piezoelectric elements A, B. The groups A, B are arranged as shifted by $\lambda/4$. Namely, the groups A, B are separated from each other by non-polarization regions 85 each having the circumferential length of $\lambda/4$. In each group, the piezoelectric elements are serially arranged by $\lambda/2$ pitch, alternating their polarities. Thus, motion extracting means 83 disposed on the vibration member 80 above the first group of piezoelectric elements A are located within the odd numbered sections a1, a3 of four quarter wavelength sections a1–a4 defined by a first standing wave Sa which is generated by the first group of piezoelectric elements A. As well, motion extracting means 83 on the side of the second group of piezoelectric elements B are located within the odd numbered sections a1, a3 of the same, because all motion extracting means 86 on the vibration member 80 are aligned by $\lambda/2$ pitch, as illustrated in FIG. 11(D). Therefore, when the vibrator formed by the first group of piezoelectric elements A is excited to generate the standing wave Sa in the vibration member 80, the moving member 84 moves clockwise.

On the other hand, when the vibrator formed by the second group of piezoelectric elements B is excited to generate the standing wave Sb, the moving member 84 moves counterclockwise, because in this case, all the motion extracting means 83 are located within the even numbered sections a2, a4 of four quarter wavelength sections a1–a4 defined by the second standing wave Sb. As illustrated in FIG. 11(A), a periodic voltage source 86 is in electrical connection with the first and second groups of piezoelectric elements A, B through a changeover switch 87. By selectively operating the switch 87, one of the groups of piezoelectric elements can be excited, thereby to permit the moving member 84 to rotate in one direction.

In this embodiment, the non-polarization regions 85 are symmetrically opposed to each other, whereas they may be arranged asymmetrically. That is, the numbers of piezoelectric elements in the groups A and B are not necessarily equal to each other.

Figure 12A:
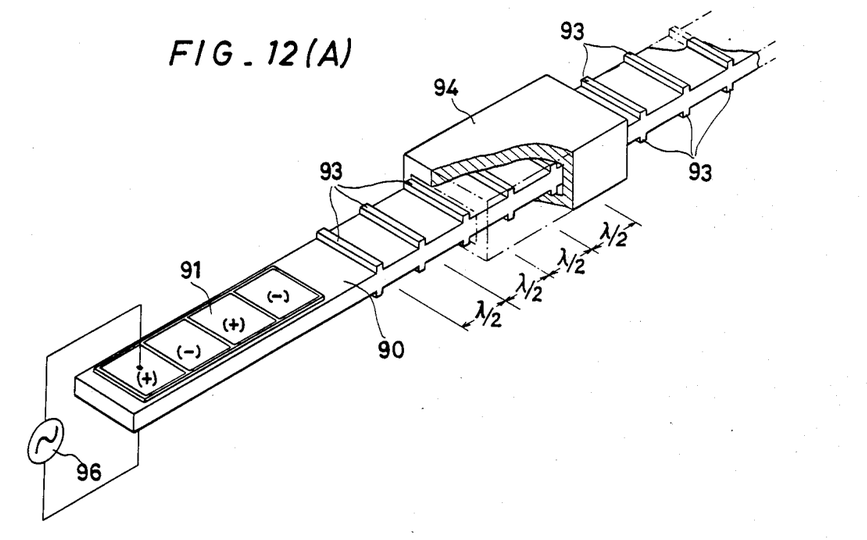
FIGS. 12(A) and 12(B) are a perspective view, with a part of the moving member being cut out, and a side view of yet another embodiment of this embodiment.
Figure 12B:
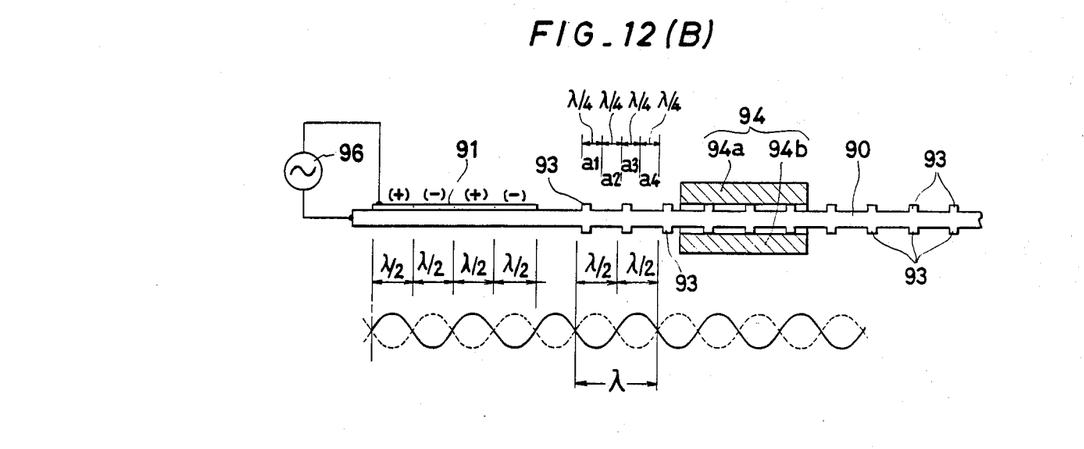

FIG. 12 shows a standing wave motor modified on the basis of the linear motor shown in FIG. 3. In this motor, motion extracting means 93 are formed on the upper and lower surfaces of elastic vibration member 90 at intervals of λ/2. Moving member 94 which moves linearly along the vibration member 90 comprises upper and lower slide parts 94a, 94b. In the illustrated embodiment, the slide parts 94a, 94b are integrally connected at both side portions to each other so as to form a rectangular tube, whereas the moving member 94 may be constructed by separately forming and elastically connecting the slide parts 94a, 94b to each other by means of an elastically connecting mechanism including a spring or the like so as to forcibly hold the vibration member 90 by the upper and lower slide parts 94a, 94b.

When vibrator 91 such as piezoelectric elements, which is attached to one end portion of the vibration member 90, is excited by a periodic voltage given by a power source 96, a standing wave is generated in the vibration member 90. Because the motion extracting means 93 are located within the odd numbered sections a1, a3 (or, the even numbered sections a2, a4) of the quarter wavelength sections defined by equally dividing each wavelength λ of the standing wave into four, the moving member 94 moves leftward (or, rightward) in the drawing.

Figure 13A:
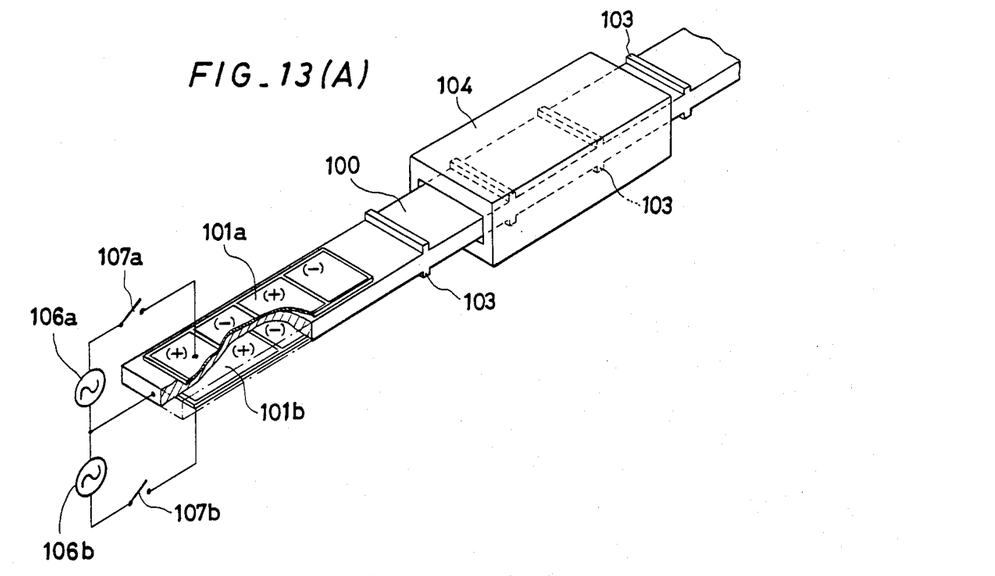
FIGS. 13(A) and 13(B) are a perspective view, with a part of the vibration member being cut out, and a side view of a further embodiment of this invention.

FIG. 13 represents still another embodiment of the invention, in which two kinds of standing waves are generated in vibration member 100, thereby to permit moving member 104 to move in either of the opposite directions. In order to generate the first standing wave Sa, there is disposed first vibrator 101a on the upper surface of the vibration member 100, and second vibrator 101b for generating the second standing wave Sb having the wavelength λb being twice that λa of the first standing wave Sa is attached to the lower surface of the vibration member 100. Therefore, the vibration pitch Pb of the second standing wave Sb is equal to twice that Pa of the first standing wave Sa. The pitch Pc by which motion extracting means 103 are disposed on either side of the vibration member 100 is substantially equal to the wavelength λa of the first standing wave Sa and half the wavelength λb of the second standing wave Sb. The motion extracting means 103 simultaneously meet the requirements that they should be located in the odd numbered sections a1 of the quarter wavelength sections defined by the first standing wave Sa while being located in the even numbered sections b2, b4 of the quarter wavelength sections defined by the second standing wave Sb.

Thus, when a first power source 106a generating a periodic voltage of first frequency is electrically connected to the first vibrator 101a by turning on a switch 107a, the vibrator 101a is excited to generate the first standing wave Sa in the vibration member 100. As a result, the motion extracting means 103 which are located in the odd numbered sections a1 relative to the first standing wave Sa are subjected to amplitude motions having the leftward motion vetor in FIG. 13(B), thereby to cause the moving member 104 to be moved leftwardly in the drawing.

Figure 13B:
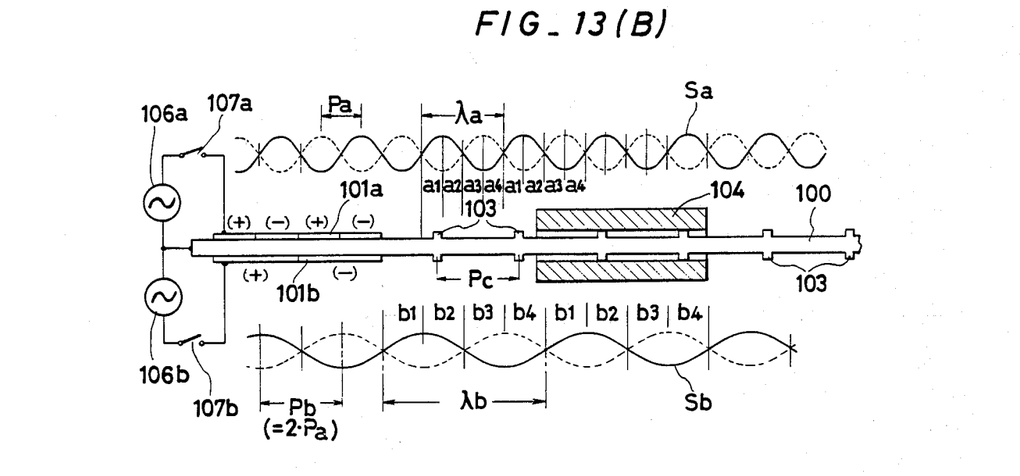

On the other hand, when the vibration member 100 is excited to vibrate by turning on a switch 107b for applying a periodic voltage of second frequency from a second power source 106b to the second vibrator 101b, the second standing wave Sb is generated in the vibration member 100, and consequently, the motion extracting means 103 located in the even numbered sections b2, b4 relative to the second standing wave Sb are subjected to amplitude motions having the rightward motion vector in the same figure, thereby to cause the moving member 104 to be moved rightwardly.

As mentined above, the moving member 104 can be moved rightward or leftward by selectively exciting one of the vibrators having the relationship that one of them is twice the other in frequency.

Figure 14A:
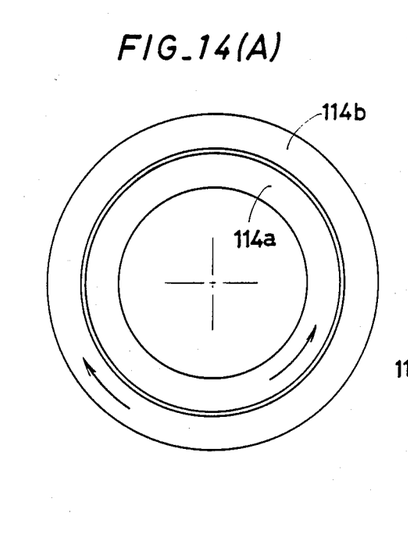
FIGS. 14(A) and 14(B) are schematic plane views respectively illustrating the moving member and the vibration member of a still further embodiment of this invention.
Figure 14B:
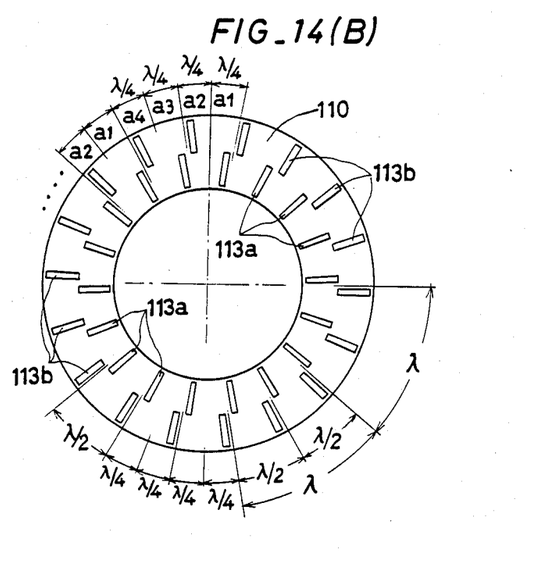

Rotary motor illustrated in FIG. 14 has moving members 114a, 114b which simultaneously rotate in the opposite directions. In this embodiment, the same vibrator as in FIG. 10 is used. On vibration member 110, two rows of motion extracting members 113a, 113b are coaxially arranged. The motion extracting means 113a in the inner row are located in the odd unmbered sections a1, a3 of the quarter wavelength sections defined by equally dividing each wavelength of the standing wave generated in the vibration member 110. The motion extracting means 113b of the outer row are located in the even numbered sections a2, a4 of the same. Thus, when the single vibrator attached to the vibration member 110 is excited, the moving members 114a, 114b are rotated in the opposite directions at a time. The vibration member 110 and moving members 114a, 114b are formed in the shape of a ring, whereas these members may be made straight to constitute a linear motor.

Figure 15:
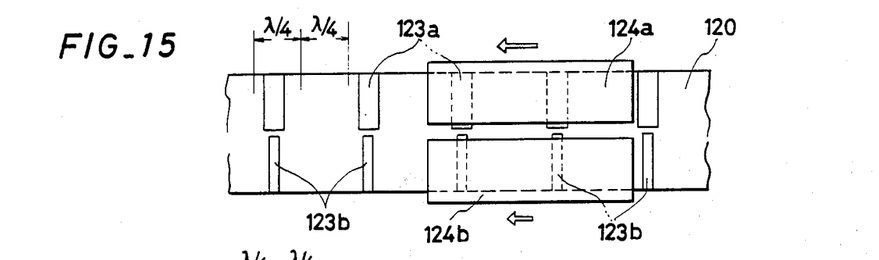
FIGS. 15 and 16 are each partial plane views schematically illustrating other embodiments of this invention.

Linear motor illustrated in FIG. 15 as a further embodiment of the invention has two moving members 124a, 124b which move along vibration member 120 in one direction at different speeds. Though this motor is provided on the vibration member 120 with two rows of motion extracting means 123a, 123b which are arranged at equal intervals, the motion extracting means in the respective rows are different in longitudinal width from each other. Therefore, kinetic energies of the standing wave, which are transmitted to the moving members 124a, 124b by means of the motion extracting means in the respective rows, are unequal as a matter of course, with the result that the moving members move at different speeds.

Figure 16:
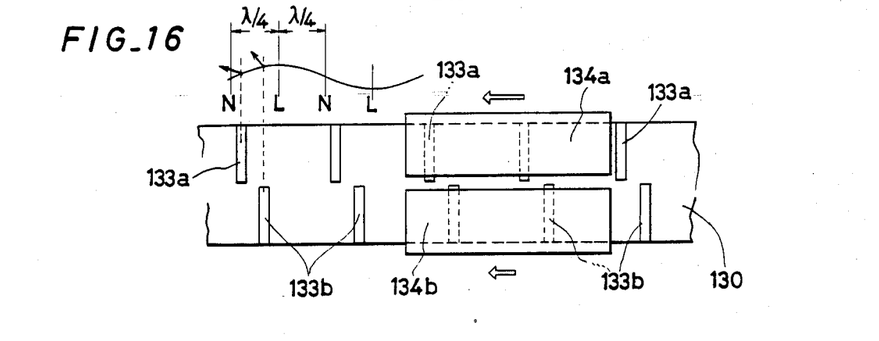

Also, there can be obtained a modified linear motor having two moving members which move at different speeds by arranging motion extracting means as illustrated in FIG. 16. Namely, in this embodiment, though the motion extracting means 133a, 133b in two rows are equal in longitudinal width and located in the same quarter wavelength sections, the motion extracting means 133a in the first row are close to the nodes N of the standing wave, whereas the motion extracting means 133b in the second row are close to the loops L of the standing wave. Similarly to the embodiment in FIG. 15, the two moving members 134a, 134b can move at different speeds.

In place of the straight vibration member as in FIGS. 15 and 16, an annular vibration member may be used to form a rotary motor having two rotors which rotate at different speeds. Moreover, though the embodiments in FIGS. 14, 15 and 16 respectively adopt two rows of motion extracting means, it is permissible that three or more rows of motion extracting means which have different longitudinal widths or are arranged at different intervals in each row be disposed on the vibration member so as to obtain a motor having three or more moving members capable of moving at speeds different from one another. Further, by combining the various arrangements of the motion extracting means as described above, motors of different types having a plurality of variously driving systems.

As can be seen from the foregoing, it is basically possible to replace the straight shaped structure as in the aforementioned linear motor with the annular or arc shaped structure as in the aforementioned rotary motor or vice versa. Thus, in the motors according to this invention, there is no distinction between the linear motor and the rotary motor. For the convenience of description, it has been explained previously that the vibration member seems to be fixed and the moving member seems movable. However, it will be understood from the viewpoint of reversibility of a motor consisting of a rotor and a stator that the vibration member in this invention may be disposed movably and instead, the moving member is fixed.

Also, the motion extracting means are not necessarily formed in the shape of angular protrusions which integrally project from the surface of the vibration member. For example, by forming the surface of the vibration member in the shape of a wave, the ridges of the wave surface thus formed may be used as motion extracting means. Furthermore, the motion extracting means such as projections or rollers are not necessarily located at regular intervals though the driving efficiency of the motor is slightly lowered. Other configurations are also possible. In the embodiments as noted above, there are used the Langevin type vibrator and the piezoelectric element such as piezoelectric ceramics, whereas a magnetostrictive vibrator, vibrating means consisting of a permanent magnet or electromagnet and coil or the like may be applied to the motor of this invention instead of the aforementioned vibrators.

As is clear from the foregoing, the present invention provides a standing wave motor having excellent performance and applicable to various machines or devices such as focusing control mechanisms in automatic focusing cameras, driving devices for magnetic or optical storage such as magnetic tape systems and disc drive systems used in electronic devices, industrial robots, machine tools, precisely positioning devices for XY plotters or the like, sheet or card feeding systems for copying machines or computers, etc.

As can be readily appreciated, it is possible to deviate from the above embodiments of the present invention and, as will be readily understood by those skilled in this art, the invention is capable of many modifications and improvements within the scope and spirit thereof. Accordingly, it will be understood that the invention is not to be limited by these specific embodiments, but only by the scope and spirit of the appended claims.

What is claimed is:

1. A standing wave motor which is driven by converting standing wave vibrations into motion, comprising an elastic vibration member; at least one vibrator disposed on said vibration member and adapted to generate a standing wave having a fixed wavelength in said vibration member by applying a periodic voltage of fixed frequency thereto, said vibration member having a length substantially equal to integral multiples of the half wavelength of the standing wave generated in said vibration member; at least one row of motion extracting means integrally formed on at least one surface of said vibration member in the shape of protrusions and located within at least one of the odd or even numbered sections of quarter wavelength sections defined by equally dividing each wavelength of the standing wave into four and at a portion substantially exclusive of a loop and a node of the standing wave, said motion extracting means each having a width less than quarter the wavelength of the standing wave generated in said vibration member in longitudinal direction relative to said vibration member; and at least one moving member being in contact with said motion extracting means on the vibration member thereby to cause relative motion of the vibration member and the moving member by transmitting amplitude motion of the standing wave generated in the vibration member to the moving member through the motion extracting means.

2. A standing wave motor according to claim 1, wherein said vibration member is formed in an annular shape whose circumferential length is substantially equal to integral multiples of the wavelength of the standing wave generated in said vibration member, said vibration is composed of a first series of piezoelectric elements having opposite polarities arranged alternately by half the wavelength of the standing wave generated in the vibration member, and a second series of piezoelectric elements having opposite polarities arranged by half the wavelength of the standing wave, said first and second series being shifted by quarter the wavelength of the standing wave, thereby to allow the moving member to selectively move in one of opposite directions by exciting one of the first and second series of piezoelectric elements.

3. A standing wave motor according to claim 1, wherein said vibrator serves as a first vibrator which is adapted to generate a first standing wave in the vibration member, and a second vibrator which is adapted to generate a second standing wave having wavelength twice that of the first standing wave is located on the vibrations member in such a state that the nodes formed every half wavelength of the second standing wave are coincident with the nodes formed every one wavelength of the first standing wave; and said motion extracting means are located as separated by integral multiples of substantially one wavelength of the first standing wave, thereby to cause the moving member to move in one of opposite directions by selectively applying a periodic voltage to one of the vibrators.

4. A standing wave motor according to claim 3, wherein said first and second vibrators are respectively attached to the opposite surfaces of the vibration member.

5. A standing wave motor according to claim 1, wherein first and second rows of said motion extracting means are arranged in parallel on said vibration member, said motion extracting means of the first row being located within the odd numbered sections of said four quarter sections and those of the second row being located within the even numbered sections of said four quarter sections; and said moving member which serves as a first moving member is brought into contact with the motion extracting means of the first row and a second moving member is brought into contact with the motion extracting means of the second row, thereby to cause the first and second moving members to move in opposite directions by exciting the vibrator to generate the standing wave in the vibration member.

6. A standing wave motor according to claim 5, wherein said first and second rows of motion extracting means are arranged in parallel on one surface of the vibration member.

7. A standing wave motor according to claim 5, wherein said vibration member assumes an annular shape and has a circumferential length substantially equal to integral multiples of the wavelength of the standing wave generated by the vibrator.

8. A standing wave motor according to claim 1, wherein a plurality of rows of the motion extracting means are arranged on the vibration member with the same phase at the same interval and have different widths in each row.

9. A standing wave motor according to claim 1, wherein said vibration member is made of an elastic rectangular bar and terminated to either end thereof at quarter the wavelength of the standing wave generated therein.

10. A standing wave motor according to claim 1, wherein said motion extracting means are located at distances of half the wavelength of the standing wave and located in all the odd numbered sections of the quarter wavelength sections.

11. A standing wave motor according to claim 1, wherein said motion extracting means are located at intervals of half the wavelength of the standing wave and located in all the even numbered sections of the quarter wavelength sections.

12. A standing wave motor according to claim 1, wherein said vibration member is fixed and said moving member is movable.

13. A standing wave motor according to claim 1, wherein one of said vibration member and moving member is fixedly disposed and the other is movably disposed so as to allow relative motion of the vibration member and the moving member.

14. A standing wave motor which is driven by converting standing wave vibrations into motion, comprising an elastic vibration member; at least one vibrator disposed on said vibration member and adapted to generate a standing wave having a fixed wavelength in said vibration member by applying a periodic voltage of fixed frequency thereto, said vibration member having a length substantially equal to integral multiples of the half wavelength of the standing wave generated in said vibration member; motion extracting means separately formed on at least one surface of said vibration member; a retainer for retaining said motion extracting means so as to locate said motion extracting means within at least one of the odd or even numbered sections of quarter wavelength sections defined by equally dividing each wavelength of the standing wave into four and at a portion substantially exclusive of a loop and a node of the standing wave; and at least one moving member being in contact with said motion extracting means on the vibration member, thereby to cause relative motion of the vibration member and the moving member by transmitting amplitude motion of the standing wave generated in the vibration member to the moving member through the motion extracting means.

15. A standing wave motor according to claim 14, wherein said motion extracting means are movably by quarter the wavelength of the standing wave relative to said vibration member in the longitudinal direction of the vibration member, thereby to allow the moving member to move selectively in one of opposite directions.

16. A standing wave motor according to claim 14, wherein said motion extracting means are rollers.

17. A standing wave motor according to claim 14, wherein said vibration member is made of an elastic rectangular bar and terminated to either end thereof at quarter the wavelength of the standing wave generated therein.

18. A standing wave motor according to claim 14, wherein said motion extracting means are located at distances of half the wavelength of the standing wave and located in all the odd numbered sections of the quarter wavelength sections.

19. A standing wave motor according to claim 14, wherein said motion extending means are located at intervals of half the wavelength of the standing wave and located in all the even numbered sections of the quarter wavelength sections.

20. A standing wave motor according to claim 14, wherein said vibration member is fixed and said moving member is movable.

21. A standing wave motor according to claim 14, wherein said vibration member is disposed movably and said moving member is fixed.

22. A standing wave motor which is driven by converting standing wave vibrations into motion, comprising,
an elastic vibration member;
at least one vibrator disposed on said vibration member and adapted to generate a standing wave having a fixed wavelength in said vibration member by applying a periodic voltage of fixed frequency thereto, said vibration member having a length substantially equal to integral multiples of the half wavelength of the standing wave generated in said vibration member;
at least one row of motion extracting means separately formed on at least one surface of said vibration member and each of said motion extracting means being located within at least one of the odd or even numbered sections of quarter wavelength sections defined by equally dividing each wavelength of the standing wave into four and at a portion substantially exclusive of a loop and a node of the standing wave; and
a retainer for retaining said motion extracting means in the state contacting with said vibration member, whereby said motion extracting means is driven by applying amplitude motion of the standing wave generated in the vibration member to said motion extracting means so as to extract as an output a motion imparted to said motion extracting means.

23. A standing wave motor according to claim 22, wherein said motion extracting means each have a width less than a quarter of the wavelength of the standing wave generated in said vibration member in longitudinal direction relative to said vibration member.

24. A standing wave motor according to claim 22, wherein said motion extracting means are movable by quarter the wavelength of the standing wave relative to said vibration member in the longitudinal direction of the vibration member.

25. A standing wave motor according to claim 22, wherein said motion extracting means are located at distances of half the wavelength of the standing wave and located in all the odd numbered sections of the quarter wavelength sections.

26. A standing wave motor according to claim 22, wherein said motion extracting means are located at intervals of half the wavelength of the standing wave and located in all the even numbered sections of the quarter wavelength sections.

27. A standing wave motor according to claim 22, wherein said motion extracting means are rollers which are retained by said retainer movable in the longitudinal direction of the vibration member, whereby said motion extracting means is rotated by applying amplitude motion of the standing wave generated in the vibration member to said motion extracting means so as to extract as an output a rotational motion produced by said motion extracting means.

* * * * *